United States Patent
Chow

[19]

[11] Patent Number: 6,078,742
[45] Date of Patent: Jun. 20, 2000

[54] HARDWARE EMULATION

[75] Inventor: Wing-Chi Chow, Toronto, Canada

[73] Assignee: ATI International, St. Kitts/Nevis

[21] Appl. No.: 08/771,651

[22] Filed: Dec. 19, 1996

[51] Int. Cl.[7] .................................................. G06F 9/455
[52] U.S. Cl. ................... 395/500.46; 395/293; 395/299; 395/309
[58] Field of Search .................................. 395/500, 293, 395/299, 309

[56] References Cited

U.S. PATENT DOCUMENTS

| | | | |
|---|---|---|---|
| 5,099,420 | 3/1992 | Barlow et al. ........................... | 395/325 |
| 5,564,041 | 10/1996 | Matsui et al. ........................... | 395/500 |
| 5,673,400 | 9/1997 | Kenny ..................................... | 395/309 |
| 5,708,783 | 1/1998 | Yazdy ..................................... | 395/293 |
| 5,748,945 | 5/1998 | Ng ......................................... | 395/500 |

*Primary Examiner*—Kevin J. Teska
*Assistant Examiner*—M. Irshadullah
*Attorney, Agent, or Firm*—Markison & Reckamp

[57] ABSTRACT

The invention features a method and apparatus for use with a computer system having a memory and a bus (e.g., a PCI bus). The bus is monitored for detection of a bus cycle intended for a controller (e.g., a DMA controller) used to transfer data between a bus device and the memory. After detection, the bus device is used to claim the bus cycle and to emulate the response of the controller to the bus cycle.

13 Claims, 7 Drawing Sheets

| DMA channel | DMA memory address register | DMA transfer count register | DMA page register |
|---|---|---|---|
| 0 | 0000h | 0001h | 0087h |
| 1 | 0002h | 0003h | 0083h |
| 3 | 0006h | 0007h | 0082h |
| 5 | 00C4h | 00C6h | 0088h |
| 6 | 00C8h | 00CAh | 0089h |
| 7 | 00CCh | 00CEh | 008Ah |

| DMA register | I/O address |
|---|---|
| slave software DRQn request | 0009h |
| slave DMA mask register | 000Ah |
| slave DMA mode register | 000Bh |
| master software DRQn request | 0002h |
| master DMA mask register | 0004h |
| master DMA mode register | 0006h |

| DMA register | I/O address |
|---|---|
| slave DMA control request | 0008h |
| slave DMA clear byte pointer | 000Ch |
| slave DMA master clear | 000Dh |
| slave DMA reset mask register | 000Eh |
| slave DMA general mask register | 000Fh |
| master DMA control request | 0000h |
| master DMA clear byte pointer | 0008h |
| master DMA master clear | 000Ah |
| master DMA reset mask register | 000Ch |
| master DMA general mask register | 000Eh |

| DMA register | I/O address |
|---|---|
| slave DMA status register | 000Ah |
| master DMA status register | 0000h |

HARDWARE EMULATION

BACKGROUND OF THE INVENTION

The invention relates to hardware emulation.

Figure 1:
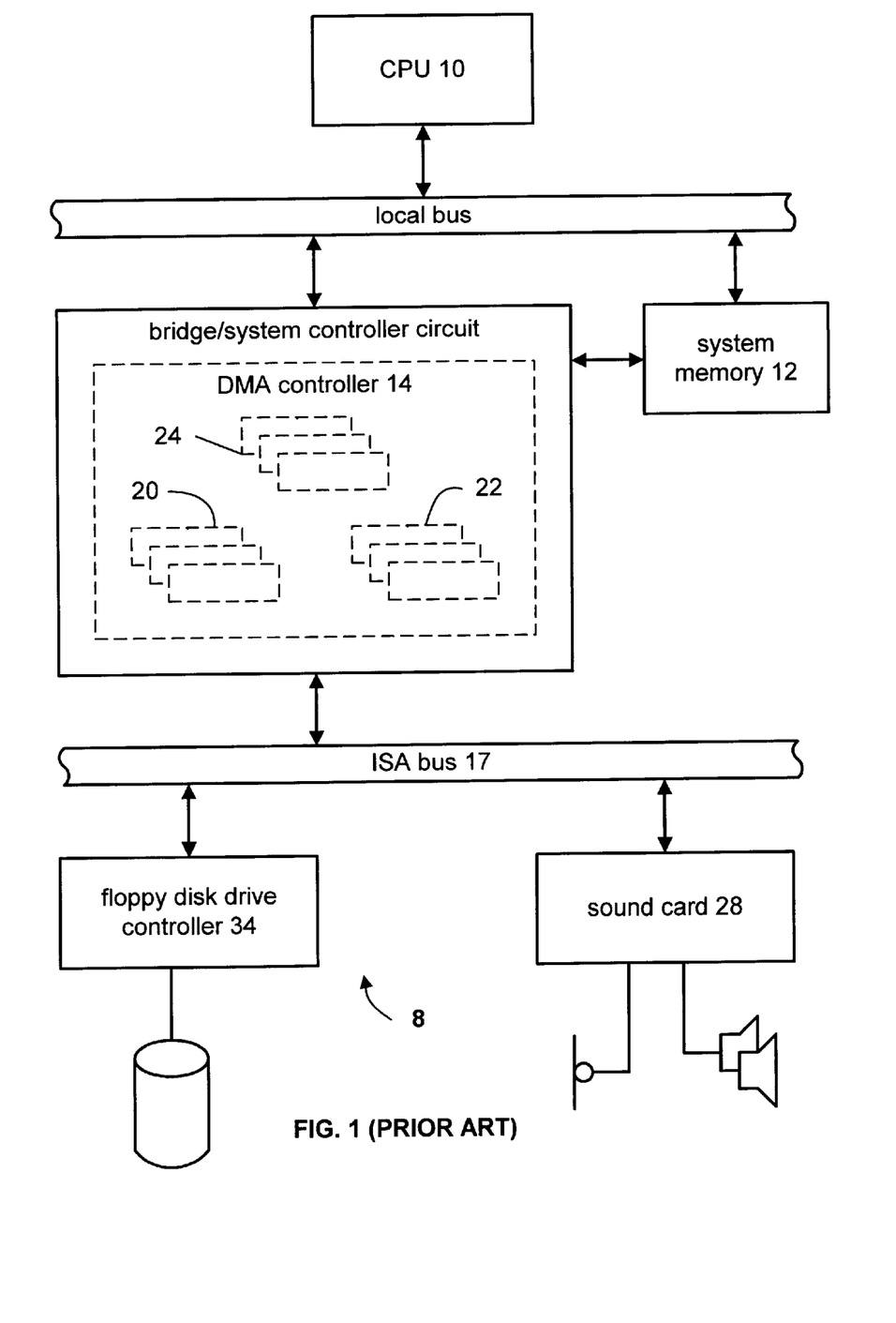
FIGS. 1 and 2 are block diagrams of computer systems of the prior art.

As shown in FIG. 1, a computer system 8 may use a direct memory access (DMA) controller 14 to transfer data between peripheral devices (e.g., a sound card 28 and a floppy disk drive controller 34) and a system memory 12. This is typically done when the peripheral devices are connected to a bus (e.g., an Industry Standard Architecture (ISA) bus 17) which does not allow the peripheral devices to directly access the system memory 12. If not for the DMA controller 14, a central processing unit (CPU) 10 of the computer system 8 would directly oversee the transfer of data between the peripheral devices and the system memory 12, and all of the data would pass through registers of the CPU 10. However, with the DMA controller 14, the CPU 10 is not directly involved in the system memory 12 accesses, thereby freeing the CPU 10 to perform other functions.

To identify the peripheral device associated with the direct memory access, seven DMA channels 0–3 and 5–7 (channel 4 is unavailable) of the ISA bus 17 are typically used. As an example of the assignments for the DMA channels, the sound card 28 might be assigned to DMA channel 1, and the floppy disk drive controller 34 might be assigned to DMA channel 2. Because the computer system 8 is only capable of handling the transfer of data for one DMA channel at a time, the DMA controller 14 prioritizes and selectively grants requests for the DMA channels.

Each DMA channel has corresponding registers 20, 22 and 24 in the DMA controller 14. The CPU 10 uses the registers 20–24 to set up a pending data transfer for one of the DMA channels. The CPU 10 stores a base address in one of eight (one associated with each channel) base address registers 20. The base address is the address in system memory 12 where the first portion of the pending transfer is written or read. The CPU 10 stores a transfer count in one of eight (one associated with each channel) transfer count registers 22. The transfer count specifies the number of DMA cycles in the pending data transfer. The CPU 10 programs control registers 24 with the type (e.g., a read) and operational mode (e.g., a block transfer) of the pending data transfer.

Once a DMA channel is set up by the CPU 10, the CPU 10 may then issue a command directing a transaction to occur between a peripheral device associated with the DMA channel and the system memory 12. When the peripheral device responds to the command, the peripheral device submits a request to the DMA controller 14 to use the associated DMA channel. After the DMA controller 14 grants the request, the data transfer begins with the DMA controller 14 furnishing the addresses to the bus 17 and the peripheral device (and system memory 12) handling the data transactions on the bus 17.

Figure 2:
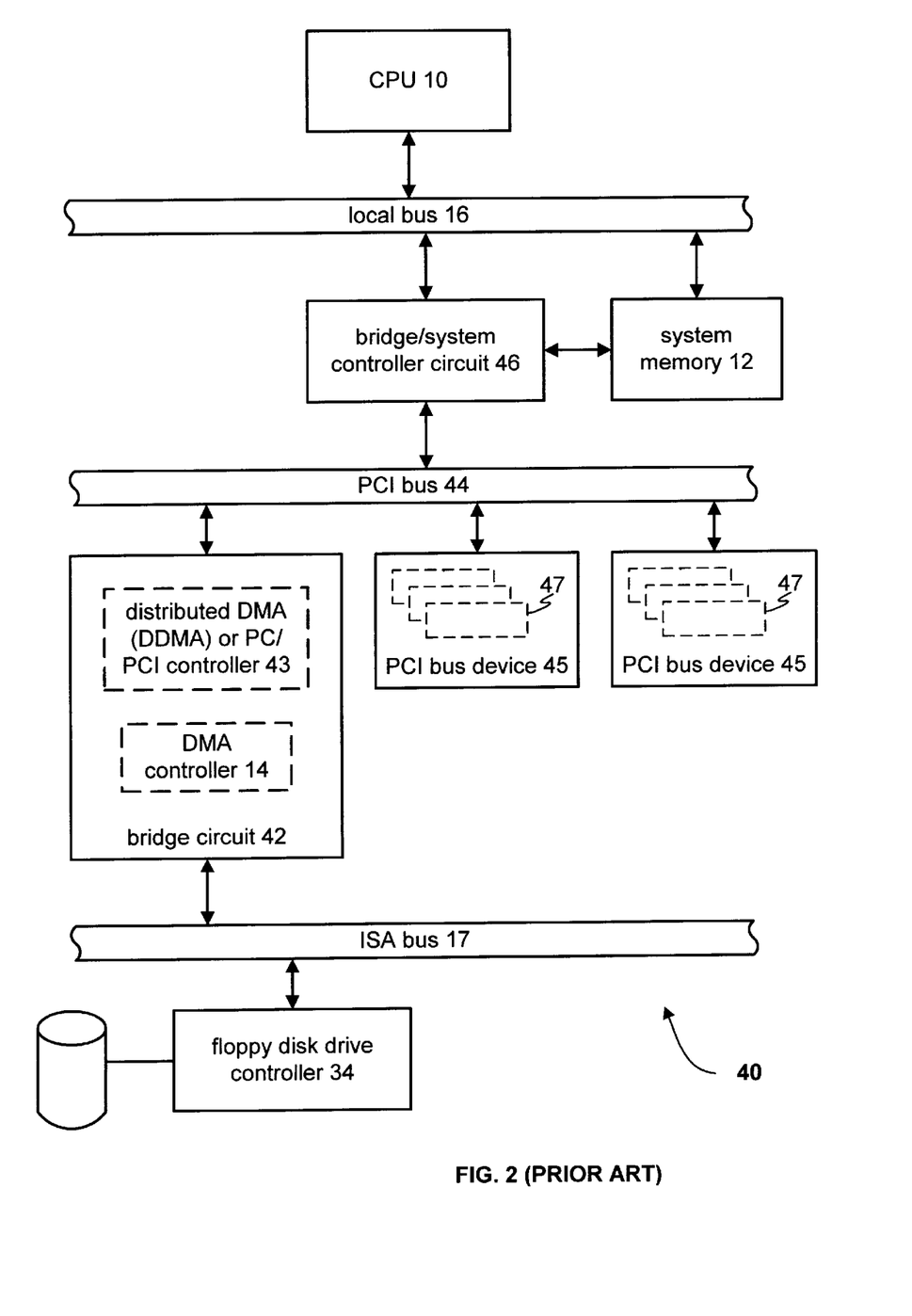

As shown in FIG. 2, unlike the older computer systems 8, more recent computer systems 40 have buses (e.g., a Peripheral Component Interconnect (PCI) bus 44) which allow peripheral devices 45 (e.g., PCI bus devices) to directly access the system memory 12. Therefore, the peripheral devices 45 may transfer data to and from the system memory 12 without receiving aid from a CPU or a DMA controller.

To make the peripheral devices 45 compatible with older software driver routines (e.g., DOS-based software written to control specific hardware of the devices 45) which assume the peripheral devices 45 cannot directly access the system memory 12, the computer system 40 might have a distributed DMA (DDMA) or PC/PCI controller 43 built into a bridge circuit 42. The controller 43 emulates the functions of the DMA controller 14 for pseudo DMA channels assigned to (for the benefit of the older software driver routines) the peripheral devices 45. The DMA controller 14 remains in control of the DMA transfers for peripheral devices (e.g., the floppy disk drive controller 34) connected to the ISA bus 17; however, the controller 43 intercepts accesses which are associated with the pseudo DMA channels. After the access is intercepted, the controller 43 reads from or writes to (according to the type of access attempted) a set of peripheral device registers 47 that are associated with the pseudo DMA channel. The peripheral device 45 then performs transactions between the system memory 12 and the peripheral device 45 based on the information in the registers 47.

Instead of using the address/data lines of the PCI bus 44, sideband signals of the PCI bus 44 might be used to establish DMA communication between the controller 43 and the peripheral devices 45. This technique is used by the PC/PCI controller.

SUMMARY OF THE INVENTION

The invention provides emulation of DMA transfers for bus devices capable of directly accessing a system memory. The invention does not require specialized bridge circuits, new protocols, or the use of bus sideband signals.

In general, in one aspect, the invention features emulating a controller used to transfer data between a bus device and a memory of a computer system. A bus coupled to the bus device is monitored for detection of a bus cycle intended for the controller. After detection, the bus device is used to emulate the response of the emulated controller to the bus cycle.

In preferred embodiments, the bus is a Peripheral Component Interconnect bus, and the controller is a direct memory access (DMA) controller. The bus cycle may include data representative of a starting address in the memory for a data transfer between the bus device and the memory. The emulation by the bus device includes claiming the bus cycle, receiving the data, and transferring other data between the bus device and the memory in response to a command (e.g., a memory read or write command) received by the bus device. The bus cycle may include data representative of a cycle count which is used to measure the number of cycles for the data transfer.

The bus cycle may include a read request for data assumed to be stored by the controller. For this type of cycle, the emulation by the bus device includes claiming the bus cycle and providing the data to the bus. The bus device first determines whether the bus device has the data, and if so, the bus device provides the data in response to the bus cycle. If not, the data is read from at least one other device of the computer system, and then the data is provided in response to the bus cycle. A bus agent furnishing the bus cycle is retried if the bus device does not have the data.

The bus cycle may include a write operation furnishing data. For this type of cycle, the bus device claims the bus cycle and receives the data. The bus device may rebroadcast the write operation.

In general, in another aspect, the invention features a bus device for use with a computer system having a memory and a bus. The bus device has a bus interface coupled to the bus and configured to detect a bus cycle intended for a controller used to transfer data between the bus device and the memory. The bus device also has an emulator coupled to the bus interface and configured to emulate the response of the controller to the bus cycle.

DESCRIPTION OF THE PREFERRED EMBODIMENTS

Figure 3:
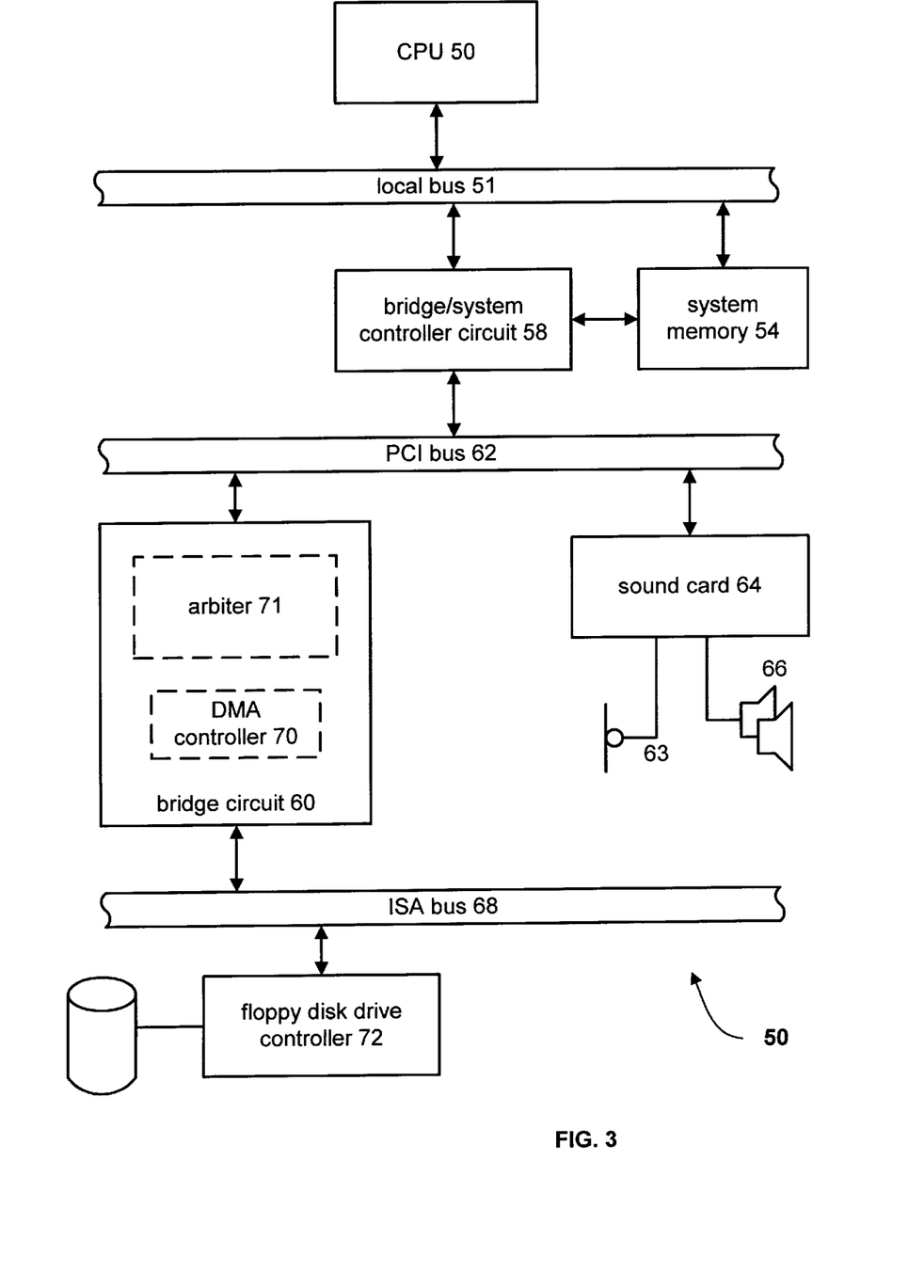
FIG. 3 is a block diagram of a computer system according to one embodiment of the invention.

As shown in FIG. 3, although from the perspective of software driver routines, a sound card 64 appears to be connected to an Industry Standard Architecture (ISA) bus 68, the sound card 64 is actually connected to a higher performance Peripheral Component Interconnect (PCI) bus 62. As typical for older software routines (e.g., DOS-based routines) written for ISA bus devices, the software driver routines set up data transfers between the sound card 64 and a system memory 54 by programming a direct memory access (DMA) controller 70. However, as typical with PCI bus devices, the sound card 64 accesses the system memory 54 without aid from the DMA controller 70. To maximize compatibility between the sound card 64 and the software driver routines, the sound card 64 monitors the PCI bus 62 for attempted accesses by the software driver routines to registers of the DMA controller 70. The sound card 64 emulates the response of the DMA controller 70 to these accesses and extracts information (e.g., memory addresses and the size of the data transfer) needed to perform requested data transfers between the sound card 64 and the system memory 54. As a result, the sound card 64 accesses the system memory 54 using the PCI bus 62 (i.e, only pseudo DMA channels exist for the benefit of the sound card 64), and the sound card 64 remains backward compatible with the software driver routines. Furthermore, a specialized controller (e.g., a DDMA or PC/PCI controller) in the bridge circuit 60 is not required.

The computer system 50 has a central processing unit (CPU) 52 coupled to a local bus 51. A bridge/system controller circuit 58 interfaces the local bus 51 to the PCI bus 62 and controls access to the system memory 54. A bridge circuit 60 interfaces the PCI bus 62 to the ISA bus 68. The bridge circuit 60 (e.g., a PCI chip set, part nos. 82430FX and 82371FB made by Intel) includes the DMA controller 70 and an arbiter 71 for the PCI bus 62. Although the DMA controller 70 does not control the pseudo DMA channel assigned to the sound card 64, the DMA controller 70 controls the actual DMA channels assigned to, for example, a floppy disk drive controller 72. The sound card 64 receives digital sound data stored in the system memory 54 and converts this data into sound provided by speakers 66. The sound card 64 also receives analog information from a microphone 63 and converts the analog information into digital data which is written to the system memory 54 by the sound card 64.

Figure 4:
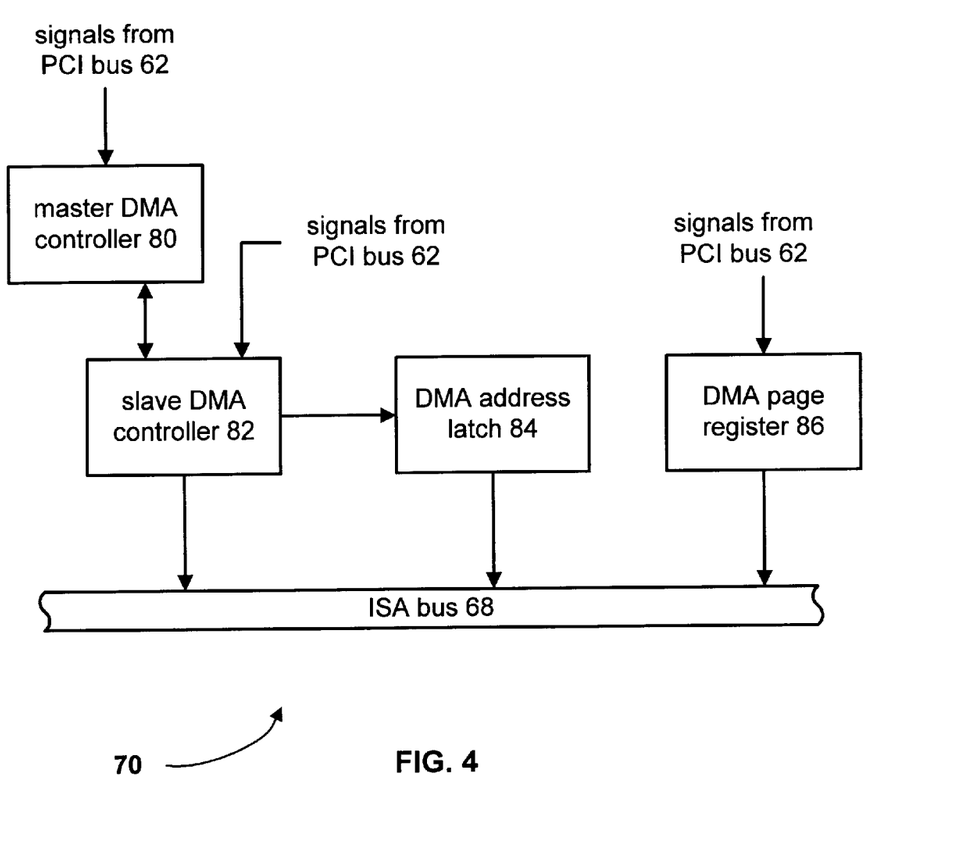
FIG. 4 is a block diagram showing the direct memory access controller of FIG. 3.

As shown in FIG. 4, the core of the DMA controller 70 is formed from a sixteen bit master DMA controller 80 and an eight bit slave DMA controller 82 (e.g., 8237A DMA controllers made by Intel) having registers which the software driver routines try to access. The DMA controllers 80 and 82 are arranged in a master-slave configuration, and due to this arrangement, one DMA channel (channel 4) is used as a communication channel between the two controllers 80 and 82. Besides the DMA controllers 80 and 82, the DMA controller 70 also includes a DMA address latch 84 (furnishing the second most significant address byte to the ISA bus 68) and a DMA page register 86 (furnishing the most significant address byte, or page, to the ISA bus 68). As typical, the slave controller 82 furnishes the least significant address byte to the DMA address latch 84. The CPU 52 directly programs the DMA page register 86 with the most significant address byte.

Figure 5:
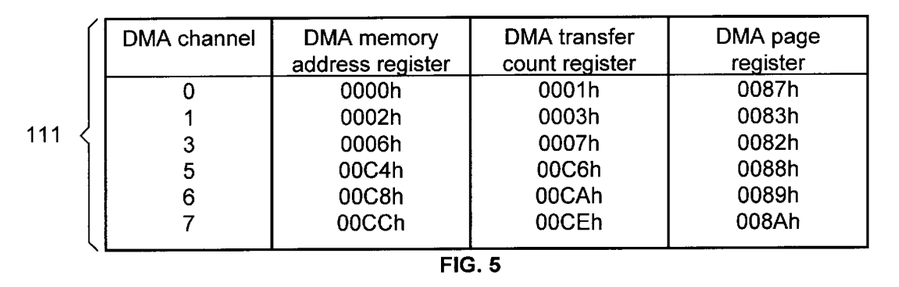
FIGS. 5–8 are tables showing the addresses of the direct memory access registers.

The sound card 64 classifies the registers of the DMA controller 70 as belonging to one of four groups 111–114. One group 111 (FIG. 5) includes registers used by the DMA controller 70 to define the portion of the system memory 54 to be accessed in the DMA transfer. The registers in the group 111 include memory address (i.e., the starting address of the transfer), transfer count (i.e., number of DMA cycles), and page address (for the DMA page register 86) registers. The sound card 64 monitors the PCI bus 62 for accesses to these registers, and when the sound card 64 recognizes a bus cycle on the PCI bus 62 corresponding to a read from or write to one of the group 111 registers, the sound card 64 claims the bus cycle.

Figure 6:
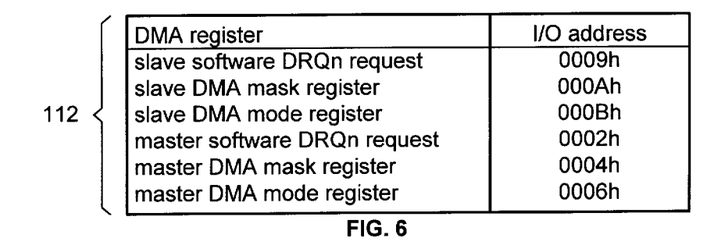

As shown in FIG. 6, another group 112 includes registers that might affect the use of the pseudo DMA channel assigned to the sound card 64. A write operation to one of these registers affects one of the DMA (pseudo or actual) channels. Although the write operation contains an identifier indicating the affected DMA channel, the sound card 64 first claims the write operation to determine which DMA channel is affected. The sound card 64 subsequently rebroadcasts the write operation to the DMA controller 70 The group 112 of registers include master (for the master DMA controller 80) and slave (for the slave DMA controller 82) DRQn (wherein the suffix "n" indicates the DMA channel number) request registers which allow software of the computer system 50 to request use of a DMA channel. The group 112 of registers also include master and slave DMA mask registers which allow software to selectively mask the DMA channels. The group 112 of registers further include slave and master DMA mode registers which allows the selection of transfer mode (e.g., demand, single, block or cascade) to be used with a selected DMA channel.

Figure 7:
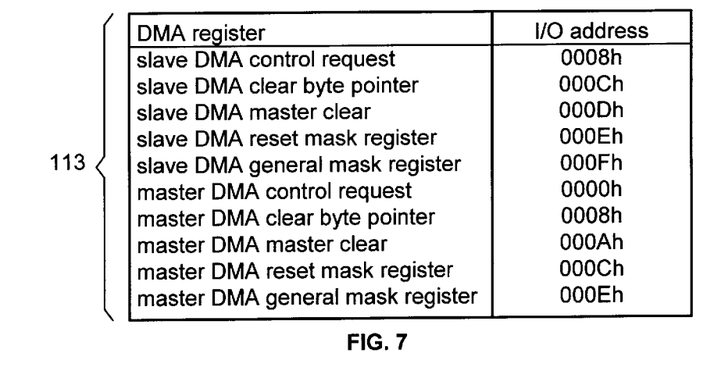

As shown in FIG. 7, another group 113 of the registers of the DMA controller 70 do not directly affect the transfer of data between the sound card 64 and the system memory 54. Although write operations to these registers control the chip level performance of the DMA controllers 80 and 82, the sound card 64 snoops writes to these registers. The group 113 of registers include slave and master DMA control registers; slave and master DMA clear byte pointer registers; slave and master DMA master clear registers; slave and master DMA reset mask registers; and slave and master DMA general mask registers.

Figure 8:
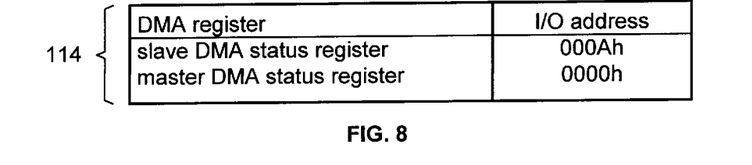

As shown in FIG. 8, another group 114 of registers contains information corresponding to the status of the DMA channels. Because the sound card 64 only knows the status of the pseudo DMA channel assigned to the sound card 64, in response to a read operation to one of these registers, the sound card 64 retrieves the status of the other DMA channels from the DMA controller 70. The sound card 64 then uses the retrieved status to furnish the data for the read operation. In order to accomplish this, the sound card 64 asserts its PCI bus master request line REQ to the arbiter 71 and subsequently retries the bus agent furnishing the read operation. Once the arbiter 71 grants the request for the PCI bus 62, the sound card 64 rebroadcasts the read operation which is received by the DMA controller 70. Once the DMA controller 70 furnishes the requested information, the sound card 64 combines the requested information with the status of the DMA channel assigned to the sound card 64. Once this is accomplished, the sound card 64 ceases retrying the bus agent and furnishes the information to the PCI bus 62 in response to the original read operation.

Figure 9:
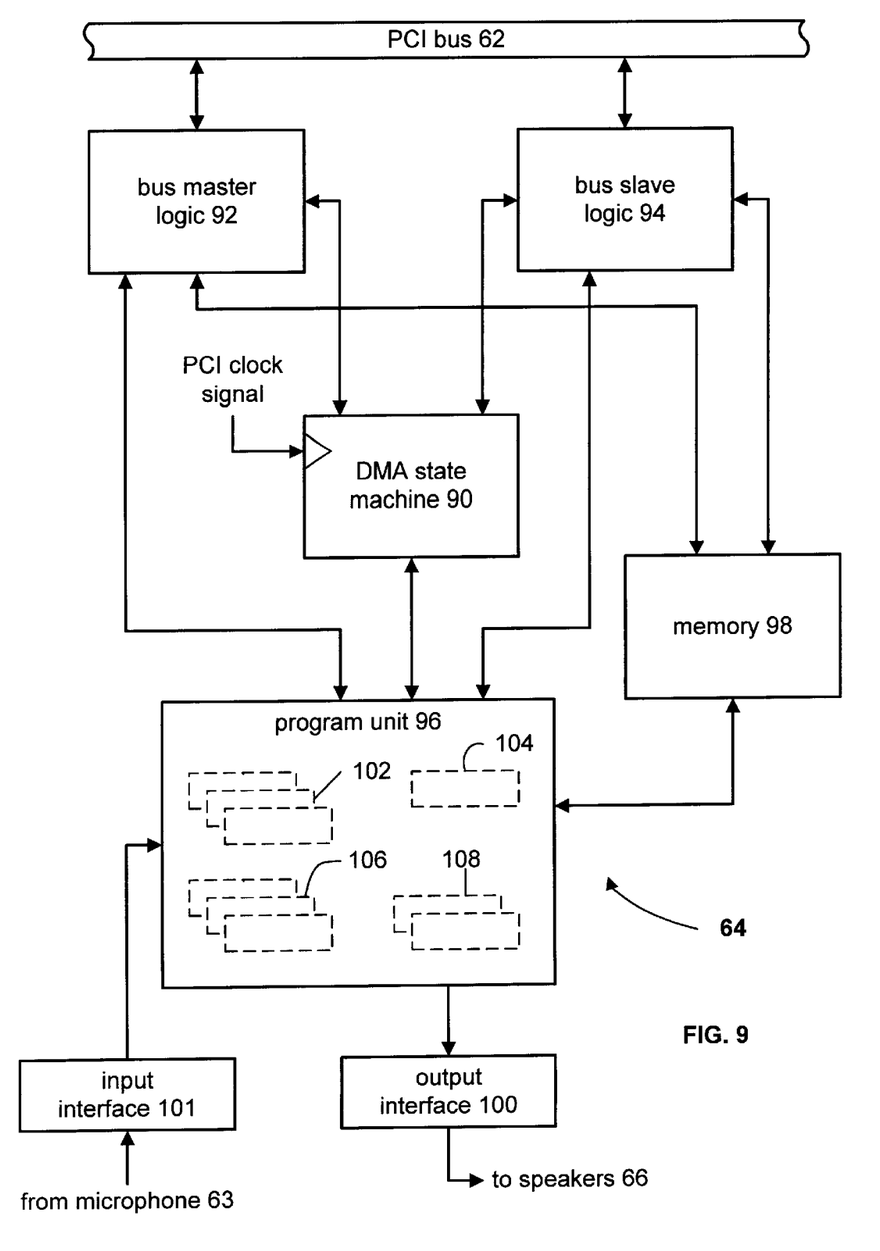
FIG. 9 is a block diagram showing the sound card of FIG. 3.

As shown in FIG. 9, the sound card 64 includes a DMA state machine 90 which decodes the addresses corresponding to the groups 111–114 of registers and handles the write and read operations to these registers as described above. The DMA state machine 90 is clocked by the PCI clock. The DMA state machine 90 interacts with bus master logic 92 to encode bus cycles onto the PCI bus 62 and interacts with bus slave logic 94 to decode bus cycles from the PCI bus 62. The sound card 64 has a memory 98 which receives digital sound data from the computer system 50. A program unit 96 retrieves the sound data stored in the memory 98 and furnishes the decompressed data to the speakers 66 via an output interface 100 (e.g., a digital-to-analog converter). The sound card 64 also has an input interface 101 (e.g., an analog-to-digital converter) which converts an analog microphone input signal (furnished by the microphone 63) into a digital data that is received by the program unit 96.

The program unit 96 has six registers 102 for storing information corresponding to the group 111 of registers, one register 104 having bits indicating the valid/invalid status of the snooped group 113 of registers, six registers 106 for storing information corresponding to the group 112 of registers, and two registers 108 for storing information corresponding to the group 114 of registers.

Figure 10:
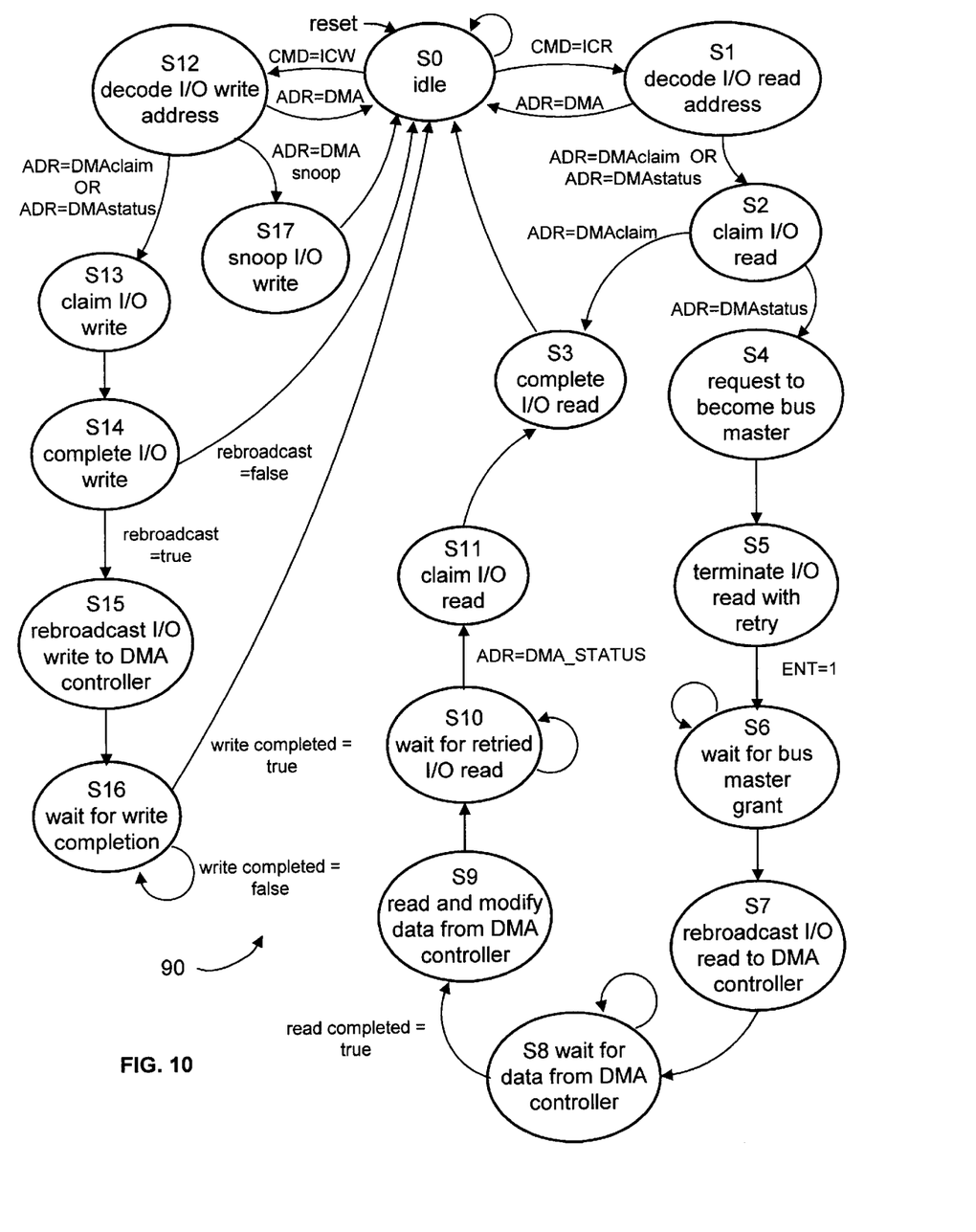
FIG. 10 is a state diagram of the direct memory access state machine of FIG. 9.

As shown in FIG. 10, upon reset of the sound card 64, the DMA state machine 90 enters a state S0 in which the DMA state machine 90 is idle. If an I/O read operation on the PCI bus 62 is detected, the sound card 64 enters a state S1 in which the address of the read operation is decoded.

If the address of the read operation corresponds to one of the registers in the groups 111 or 114, then the DMA state machine 90 enters a state S2 in which the DMA state machine 90 interacts with the bus slave logic 94 to claim the read operation. Otherwise, the state machine 90 returns to the state S0. If the read request is for the group 111 of registers, the DMA state machine 90 then transitions to a state S3 in which the read request is completed (and subsequently the state machine 90 transitions back to the state S0).

If the read request is for one of the group 114 of status registers, then the DMA state machine 90 enters a state S4. In the state S4, the DMA state machine 90 interacts with the bus master logic 92 to become a bus master on the PCI bus 62. The DMA state machine 90 then transitions to a state S5 in which the DMA state machine 90 instructs the bus slave logic 94 to retry the read operation on the PCI bus 62. The DMA state machine 90 then transitions to a state S6 in which the DMA state machine 90 waits for the arbiter 71 to grant the request to become bus master. Once the grant is received, the DMA state 90 transitions to a state S7 in which the DMA state machine 90 interacts with the bus master logic 92 to rebroadcast the read operation to the DMA controller 70. The DMA state machine 90 subsequently transitions to a state S8 in which the DMA state machine 90 waits for the requested data from the DMA controller 70.

Once the data is received from the DMA controller 70, DMA state machine 90 transitions to a state S9 in which the DMA controller 70 modifies the data to reflect the status of the DMA channel assigned to the sound card 64. The DMA state machine 90 then transitions to a state S10 in which the DMA state machine 90 interacts with the bus slave logic 94 to monitor the PCI bus 62 for the retried read operation. Once the retried read operation is detected, the DMA state machine 90 transitions to a state S11 in which the DMA state machine 90 interacts with the bus slave logic 94 to claim the read on the PCI bus 62. Once the read request is claimed, the DMA state machine 90 transitions to the state S3 in which the requested read data is furnished to the PCI bus 62.

If in the state S0 the DMA state machine 90 detects an I/O write operation, the DMA state machine 90 transitions to a state S12 in which the DMA state machine 90 decodes the address of the write operation. If the write operation is directed to the group 113 of the registers, then the DMA state machine 90 transitions to a state S17 in which the corresponding bit of the register 104 is updated, and then the DMA state machine 90 transitions back to the state S0.

If in the state S12, the DMA state machine 90 determines the write request is directed to the group 111 or 112 of registers, then DMA state machine 90 transitions to a state S13 in which the DMA state machine 90 interacts with the bus slave logic 94 to claim the write operation. The DMA state machine 90 then transitions to a state S14 in which the DMA state machine 90 interacts with the bus slave logic 94 to complete the write request by accepting the data of the write operation. If the write request is to one of the group 112 of registers, then the DMA state machine 90 transitions to a state S15. Otherwise, the DMA state machine 90 transitions back to the state S0.

In the state S15, the DMA state machine 90 interacts with the bus master logic 92 to rebroadcast the write operation to the DMA controller 70. The DMA state machine 90 then transitions to a state S16 to wait for the completion of the rebroadcasted write operation (i.e., to wait for the DMA controller 70 to claim the write operation). Once the write operation is completed, the DMA state machine 90 transitions to the state S0.

Other embodiments are within the scope of the following claims. For example, in another embodiment, the sound card may be used in a computer system (e.g., a computer system having only PCI expansion buses) that does not have the hardware (e.g., no DMA controller or ISA bus) to support DMA transfers. In this embodiment, only pseudo DMA channels exist.

What is claimed is:

1. In a computer system, where a software driver communicates with a DMA controller to control data transfers between a bus device and a system memory, an improved method for transferring the data between the bus device and the system memory comprises the steps of:

a) monitoring, by the bus device, a PCI bus for a bus cycle intended for the DMA controller, wherein the bus cycle corresponds to a communication from the software driver to the DMA controller regarding the data transfer between the bus device and the system memory; and b) when the bus cycle is detected, directly accessing, by the bus device, the system memory via the PCI bus based on the bus cycle.

2. The method of claim 1 further comprises classifying, by the bus device, at least one of a plurality of registers of the DMA controller.

3. The method of claim 2 further comprises:

when the bus device recognizes the bus cycle on the PCI bus, claiming, by the bus device, the bus cycle corresponding to a read from or a write to the at least one of a plurality of registers wherein the registers are used by the DMA controller to define the portion of the system memory to be accessed in the DMA transfer;

receiving, by the bus device, the data corresponding to the registers that are used by the DMA controller to define the portion of the system memory to be accessed in the DMA transfer; and transferring to and from the system memory, by the bus device, the data corresponding to the registers that are used by the DMA controller to define the portion of the system memory to be accessed in the DMA transfer.

4. The method of claim 2 further comprises:

when the bus device recognizes the bus cycle on the PCI bus, claiming, by the bus device, the bus cycle corresponding to a read from or a write to the at least one of a plurality of registers wherein the registers may affect the use of a pseudo DMA channel assigned to the bus device for the software driver;

receiving, by the bus device, the data corresponding to the registers that may affect the use of a pseudo DMA channel assigned to the bus device for the software driver; and transferring to and from the system memory, by the bus device, the data that may affect the use of a pseudo DMA channel assigned to the bus device for the software driver.

5. The method of claim 2 further comprises:

when the bus device recognizes the bus cycle on the PCI bus, claiming, by the bus device, the bus cycle corresponding to a read from or a write to the at least one of a plurality of registers wherein the registers control a chip level performance of the DMA controller;

receiving, by the bus device, the data corresponding to the registers that may control the chip level performance of the DMA controller; and transferring to and from the system memory, by the bus device, the data that may control the chip level performance of the DMA controller.

6. The method of claim 2 further comprises:

when the bus device recognizes the bus cycle on the PCI bus, claiming, by the bus device, the bus cycle corresponding to a read from or a write to the at least one of a plurality of registers wherein the registers contain information corresponding to the status of the DMA controller channels;

receiving, by the bus device, the data corresponding to the registers that contain information corresponding to the status of the DMA controller channels; and transferring to and from the system memory, by the bus device, the data that contains information corresponding to the status of the DMA controller channels.

7. An improved bus device for transferring data between the bus device and a system memory in a computer system, where a software driver communicates with a DMA controller to control the data transfers between the bus device and a system memory, the bus device comprises:

a bus device interface that:
  monitors a PCI bus for a bus cycle intended for the DMA controller, wherein the bus cycle corresponds to a communication from the software driver to the DMA controller regarding the data transfer between the bus device and the system memory, and
  directly accesses the system memory via the PCI bus based on the bus cycle when the bus cycle is detected;

a DMA state machine, operably coupled to the bus device interface, which decodes addresses corresponding to groups of registers in the DMA controller when the bus device interface detects the bus cycle on the PCI bus;

memory, operably coupled to the bus device interface, which receives digital sound data from the computer system;

a program unit, operably coupled to the memory, the DMA state machine, the bus device interface and an output interface, retrieves and sends the digital sound data to speakers via an output interface; and an input interface, operably coupled to the program unit, which converts an analog microphone input signal, furnished by a microphone, into digital data that is received by the program unit.

8. The improved bus device of claim 7 further comprises the bus device to classify at least one of a plurality of registers of the DMA controller.

9. The improved bus device of claim 8 further comprises the bus device to:

claim the bus cycle corresponding to a read from or a write to the at least one of a plurality of registers when the bus device recognizes the bus cycle on the PCI bus, wherein the registers are used by the DMA controller to define the portion of the system memory to be accessed in the DMA transfer;

receive data corresponding to the registers that are used by the DMA controller to define the portion of the system memory to be accessed in the DMA transfer; and transfer to and from the system memory the data corresponding to the registers that are used by the DMA controller to define the portion of the system memory to be accessed in the DMA transfer.

10. The improved bus device of claim 8 further comprises the bus device to:

claim the bus cycle corresponding to a read from or a write to the at least one of a plurality of registers when the bus device recognizes the bus cycle on the PCI bus, wherein the registers may affect the use of a pseudo DMA channel assigned to the bus device for the software driver;

receive the data corresponding to the registers that may affect the use of a pseudo DMA channel assigned to the bus device for the software driver; and transfer to and from the system memory the data that may affect the use of a pseudo DMA channel assigned to the bus device for the software driver.

11. The improved bus device of claim 8 further comprises the bus device to:

claim the bus cycle corresponding to a read from or a write to the at least one of a plurality of registers when the bus device recognizes the bus cycle on the PCI bus, wherein the registers control a chip level performance of the DMA controller;

receive the data corresponding to the registers that may control the chip level performance of the DMA controller; and transfer to and from the system memory the data that may control the chip level performance of the DMA controller.

12. The improved bus device of claim 8 further comprises the bus device to:

claim the bus cycle corresponding to a read from or a write to the at least one of a plurality of registers when the bus device recognizes the bus cycle on the PCI bus, wherein the registers contain information corresponding to the status of the DMA controller channels;

receive data corresponding to the registers that contain information corresponding to the status of the DMA controller channels; and transfer to and from the system memory the data that contains information corresponding to the status of the DMA controller channels.

13. The improved bus device of claim 8, wherein the program unit further comprises registers to store the data corresponding to the at least one of a plurality of registers of the DMA controller.

* * * * *